(12) United States Patent
Aleskerov et al.

(10) Patent No.: US 10,275,418 B2
(45) Date of Patent: Apr. 30, 2019

(54) METHOD FOR SELECTING VALID VARIANTS IN SEARCH AND RECOMMENDATION SYSTEMS (VARIANTS)

(71) Applicant: National Research University Higher School of Economics (HSE), Moscow (RU)

(72) Inventors: Fuad T. Aleskerov, Moscow (RU); Evgeny O. Mitichkin, Mytischi (RU); Vyacheslav V. Chistyakov, Nizhny Novgorod (RU); Sergey V. Shvydun, Mytischi (RU); Viacheslav I. Iakuba, Moscow (RU)

(73) Assignee: National Research University Higher School of Economics (HSE), Moscow (RU)

( * ) Notice: Subject to any disclaimer, the term of this patent is extended or adjusted under 35 U.S.C. 154(b) by 496 days.

(21) Appl. No.: 14/857,612

(22) Filed: Sep. 17, 2015

(65) Prior Publication Data
US 2016/0004775 A1    Jan. 7, 2016

Related U.S. Application Data

(63) Continuation of application No. PCT/RU2013/001180, filed on Dec. 27, 2013.

(30) Foreign Application Priority Data

Mar. 22, 2013 (RU) .................................. 2013112805

(51) Int. Cl.
*G06F 16/00* (2019.01)
*G06F 16/951* (2019.01)
(Continued)

(52) U.S. Cl.
CPC .......... *G06F 16/951* (2019.01); *G06N 5/003* (2013.01); *G06N 5/02* (2013.01)

(58) Field of Classification Search
CPC ......... G06F 17/30864; G06F 17/30867; G06F 16/951; G06F 16/00; G06N 5/003
(Continued)

(56) References Cited

U.S. PATENT DOCUMENTS

| 8,370,280 B1 * | 2/2013 | Lin ...................... G06N 99/005 706/12 |
| 2004/0194141 A1 | 9/2004 | Sanders |

(Continued)

FOREIGN PATENT DOCUMENTS

| RU | 2367997 C2 | 9/2009 |
| RU | 2435212 C2 | 11/2011 |

(Continued)

OTHER PUBLICATIONS

International Search Report from PCT/RU2013/001180 filed Dec. 27, 2013, dated May 7, 2014.
(Continued)

*Primary Examiner* — Vincent F Boccio
(74) *Attorney, Agent, or Firm* — Patentbar International, P.C.

(57) ABSTRACT

Selecting and ranking valid variants in search and recommendation systems selects and ranks variants with accuracy and speed. Criteria for evaluating the relevance of a variant to the search request are generated. A set of procedures for the selection and ranking of variants and a sequence for performing said procedures for the selection of variants evaluated as the most valid are established. An evaluation of each variant is based on relevance to search request criteria. The variants are then ranked by assigning a rank to each variant based on the condition of correspondence to the
(Continued)

greatest number of criteria in decreasing order. Then the variants are selected and ranked in at least two stages using the superposition method, and the variants are selected, ranked and excluded until all of the established selection procedures have been used and the selected group of variants is evaluated as being the most valid.

9 Claims, 1 Drawing Sheet

(51) Int. Cl.
 *G06N 5/02* (2006.01)
 *G06N 5/00* (2006.01)
(58) Field of Classification Search
 USPC .................................. 707/749, 748, 751
 See application file for complete search history.

(56) References Cited

U.S. PATENT DOCUMENTS

| | | | | |
|---|---|---|---|---|
| 2005/0065955 A1* | 3/2005 | Babikov | .......... | G06F 17/30607 707/999.101 |
| 2007/0005587 A1* | 1/2007 | Johnson | .............. | G06F 17/3053 707/999.005 |
| 2007/0288404 A1* | 12/2007 | Kacmarcik | ......... | G06F 17/2881 706/11 |
| 2009/0164435 A1* | 6/2009 | Routt | ................ | G06F 17/30864 707/999.003 |
| 2010/0332430 A1* | 12/2010 | Caraviello | ............. | G06N 5/025 706/13 |
| 2013/0036112 A1 | 2/2013 | Poon | | |
| 2014/0249927 A1* | 9/2014 | De Angelo | ........ | G06Q 30/0269 705/14.64 |

FOREIGN PATENT DOCUMENTS

| | | |
|---|---|---|
| RU | 2435213 C2 | 11/2011 |
| RU | 2443015 C2 | 2/2012 |
| WO | 2010/075408 A1 | 7/2010 |

OTHER PUBLICATIONS

Taylor et al., SoftRank: Optimizing Non-Smooth Rank Metrics, 2008, http://www.wsdm2009.org/wsdm2008.org/WSDM2008-papers/p77.pdf.
Xu et al., AdaRank: A Boosting Algorithm for Information Retrieval, http://research.microsoft.com/en-us/people/hangli/xu-sigir07.pdf.
Qin et al., Query-Level Lost Functions for Information Retrieval, Information Processing & Management, 2008, pp. 838-855, v. 44.
Zhe et al., Learning to Rank: From Pairwise Approach to Listwise Approach, 2007, http://www.machinelearning.org/proceedings/icml2007/papers/139.pdf.
Tsai, et al., FRank: A Ranking Method with Fidelity Loss, http://research.microsoft.com/en-us/people/taoqin/qin-sigir07c.pdf.
Freund et al., An Efficient Boosting Algorithm for Combining Preferences, Journal of Machine Learning Research, 2003, pp. 933-969, v. 4.
Burges et al., Learning to Rank Using Gradient Descent, http://icml.cc/2015/wp-content/uploads/2015/06/icml_ranking.pdf.
Cortes et al., Support-Vector Networks, Machine Learning, 1995, pp. 273-297, v. 20, Kluwer Academic Publishers, Boston.
Li et al., Learning to Rank Using Multiple Classification and Gardient Boosting, http://citeseerx.ist.psu.edu/viewdoc/summary?doi=10.1.1.143.6630.
Aleskerov et al., Modeling of Behavior and Intelligence. On the Degree of Manipulability of Social Choice Rules, Automation and Remote Control, 1998, pp. 134-146, vol. 59, No. 10.

\* cited by examiner

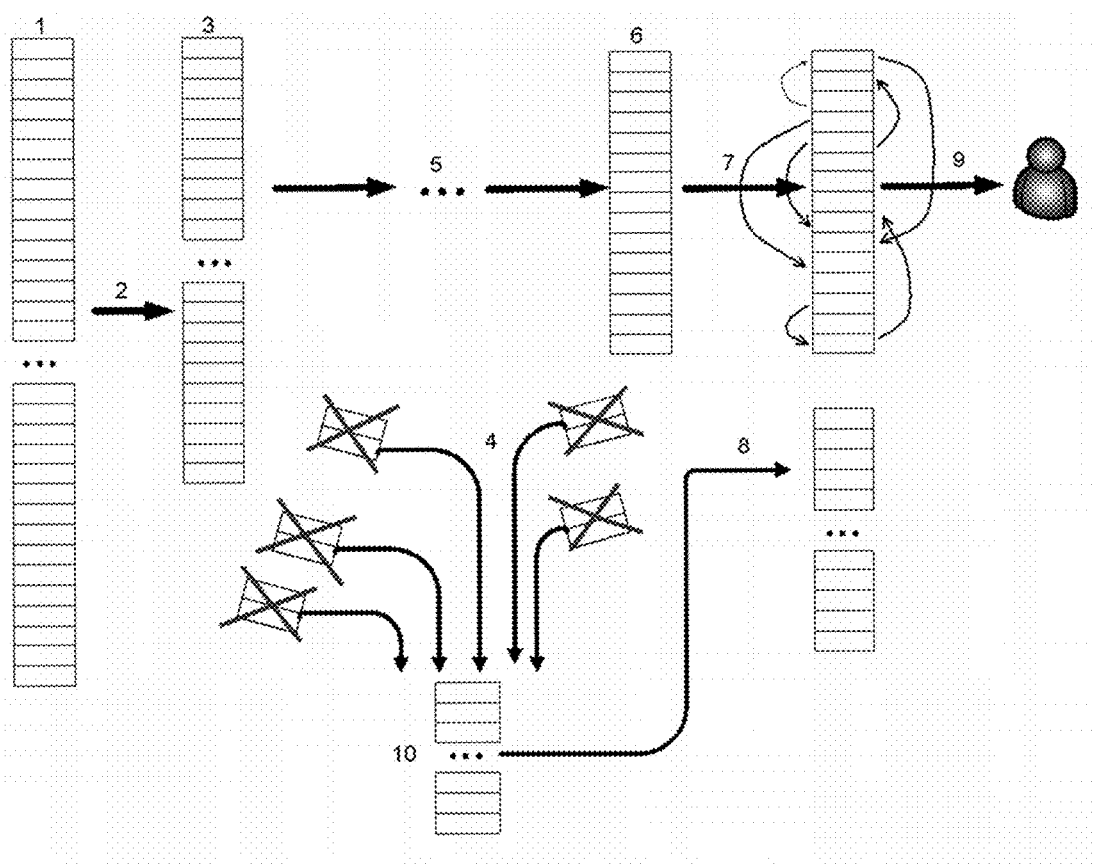

METHOD FOR SELECTING VALID VARIANTS IN SEARCH AND RECOMMENDATION SYSTEMS (VARIANTS)

RELATED APPLICATIONS

This application is a Continuation application of International Application PCT/RU2013/001180, filed on Dec. 27, 2013, which in turn claims priority to Russian Patent Applications No. RU 2013112805, filed Mar. 22, 2013, both of which are incorporated herein by reference in their entirety.

FIELD OF THE INVENTION

The invention relates to the field of computing engineering and can be implemented on modern high-speed computers and used, for instance, for the selection of effective options in search and recommendation systems, decision support systems, Internet networks, traffic classification systems and other relevant fields. The implementation of the present invention may include information storage on physical media, magnetic disks, network data storages or other media, information processing on computers and presentation of the obtained set of effective options to the end-user in any form accessible to her.

BACKGROUND OF THE INVENTION

For convenience and clear understanding of the presented invention, the terms used in this paper have the following meanings.

Search engine means a computer program designed for the search of information on the Internet. The search is conducted according to a query of the user. The results of the search are provided to the end-used in a form of ranking according to some relevancy index. The examples of search engines are Microsoft Bing search engine, Google search engine, Yahoo search engine or Yandex search engine.

Recommendation system means a computer program that selects from some presented set of alternatives (options) those ones which can be interesting according to some criteria for a particular user of the system. It should be noted that in most cases the results of recommendation systems are either a set of recommended options or ranking of all of these options or a part of them. Different methods of information processing and transformation which are used in recommendation systems can be applied to other related fields, for instance, to the problem of efficiency evaluation of enterprises, etc.

Superposition (in the present context, in contrast to the known term of superposition in physics) means a sequential elimination of options from the initial set according to some rules which can be different in different stages. The examples of such rules are provided in Appendix 1. In the first stage the elimination of options is made from the initial set of alternatives while in further stages it is made from the remained set of effective options.

Efficient ("good") elements (options, items) mean elements, which are the best, most preferred or most useful according to some given criteria when it is necessary to make a ranking of options for satisfying the needs of the users (individuals, experts, agents).

Inefficient ("bad") elements (options, items) mean elements, which obviously never (under no circumstances) can be used for problem solving since there are more preferred alternatives.

The efficiency (utility) value according to which a set of selection and ranking rules is defined is given by experts.

Most search engines have some tools for data storage and processing that contain efficiency evaluations (relevance) of large representative sets of queries and search results to these queries. In such tools the query and the results of the query (a set of options) are characterized by a set of criteria as well as by relevance evaluations assessed by the experts (assessors).

There are various formal criteria for evaluating the relevance of the search element to the query (for instance, the term frequency or TF-IDF which take into account the frequency and the importance of each term of the query). It should be noted that these formal criteria are rather algorithms which are used by search engines than independent criteria which evaluate the results of the search. Evaluations calculated by such formal criteria can still be very different comparing to evaluations given by experts.

There are three main approaches for the selection and ranking of options.

There is an approach for selection and ranking of options when a numerical or ordinal score is assigned to each option according to some criteria. The score of each option represents its relative importance. The most frequently used method is a regression one.

Another example is McRank algorithm which consists in calculating so-called "expected relevance" for each pair "query-option" which is a function of the probability that the option belongs to some class of relevance. All options are ranked according to the calculated values of the "expected relevance" [Ping L., Burges C J C, Wu Q. McRank: Learning to Rank Using Multiple Classification and Gradient Boosting. NIPS. Curran Associates, 2007].

There is an approach for the selection and ranking of options which consists in the pairwise comparison of options. The selection of efficient options is made according to the binary classifier. The examples of this approach are support vector machine models, which construct a hyperplane or a set of hyperplanes in a high- or infinite-dimensional space with the largest distance to the nearest option of any relevance class [S. Cortes, V. N. Vapnik; "Support-Vector Networks", Machine Learning, 20, 1995]. Other examples of this approach are:

RankNet [Christopher J. C. Burges, Tal Shaked, Erin Renshaw, Ari Lazier, Matt Deeds, Nicole Hamilton, Gregory N. Hullender: Learning to rank using gradient descent. ICML 2005: 89-96] which use a neural network and a simple probabilistic cost function for the ranking of options.

RankBoost [Y. Freund, R. Iyer, R E Schapire, and Y. Singer. An efficient boosting algorithm for combining preferences. J. Mach. Learn. Res., 4: 933-969, 2003] which consists in the sequential composition of machine learning algorithms for the classification of pairs of options.

FRank [M. Tsai, T.-Y. Liu, et ah FRank: A Ranking Method with Fidelity Loss, SIGIR 2007] which is a modification of the RankNet method that instead of simple probabilistic cost function use a fidelity loss function, etc.

There is an approach for the selection and ranking of options which consists in a listwise comparison of options. The examples of this approach are 1. A method for constructing trees and minimization of the loss function ListNet, which introduces a probability space on the set of permutations. The entropy function is used as the loss function in this method. [Zhe Cao, Tao Qin, Tie-Yan Liu, Ming-Feng Tsai, and Hang Li. Learning to Rank: From Pairwise Approach to Listwise Approach, 2007], 2. The method of the listwise comparison of options RankCosine, which uses a loss function based on the cosine similarity between the ranking list of options and the corresponding ground truth [T. Qin, X.-D. Zhang, M.-F. Tsai, D.-S. Wang, T.-Y. Liu, H. Li: Query-level loss functions for information retrieval. Inf. Process. Manage. 44 (2): 838-855, 2008].

3. The ranking method AdaRank that uses the machine learning algorithm AdaBoost. AdaBoost is an algorithm that linearly combines classifiers for making ranking predictions. [Xu, J., Li, H.: AdaRank: a boosting algorithm for information retrieval. SIGIR 2007], 4. The ranking method SoftRank which performs a direct optimization of non-smooth ranking metrics [Michael Taylor, John Guiver, Stephen Robertson, and Tom Minka. SoftRank: Optimising Non-Smooth Rank Metrics, 2008], etc.

All these methods produce some good results in particular areas. The disadvantages of these methods for the selection and ranking of options are:

The use of sophisticated procedures on large datasets which leads to the significant increase in the computational complexity;

Low accuracy of selection and ranking of options in case of large number of criteria and/or options.

Decision trees are usually used on large datasets. The decision tree method consists in the construction of a sequence of threshold procedures on different criteria. Decision trees have some disadvantages. First, the results of decision trees have a low reliability, since the use of threshold procedures is not always justified (effective). Second, decision trees do not allow the use of a group of criteria at the same stage. Finally, it is often difficult to perform the selection or ranking of all options with the use of only one or multiple criteria. Thus, it is necessary to construct a large number of different decision trees and aggregate their results.

Some methods are known from the Russian Federation patents No 2435212 ("Data collection of user behavior when searching the web to improve the search relevance"—["Sbor dannih o polzovatelskov povedenii pri veb-poiske dlya povysheniya relevantnosti poiska"]), No 2443015 ("Ranking functions using Bayesian classifier of queries with incremental update"—["Funktsii ranzhirovaniya, ispolzuyushchie modifitsirovanniy bayesovskiy klassifikator zaprosov s incrementnym obnovleniem"]), No 2367997 ("Improved systems and methods for the ranking of documents on the basis of structurally linked information"—["Usovershenstvovannie sistemi i sposoby ranzhirovaniya dokumentov na osnovanii strukturno vzaimosvyazannoy informatsii"]) which consists in gathering some additional information (Bayesian classifier, user behavior, structural relationships of documents) for the selection and ranking of options. The main disadvantage of these methods is that all of them make existing methods of selection and ranking of options more complicated as some additional criteria have to be used.

The method most related to our invention relies on the calculation of temporary weights for the search results. On the first stage the user event corresponding to the search result is identified. The user event has the start time, the end time and the duration. On the next stage the current time is determined and the temporary weights for the search results are calculated on the basis of the temporal proximity of the current time to the user event. It is assumed in the method that the temporary weight varies with time: it increases exponentially as the current time approaches to the start time of the event, it is constant during the event and it decreases after the end time of the event. The method is designed for the search of information on the Internet using a temporary weights for the search results (Russian Federation patent No 2435213, IPC G06F 17/30, 27 Nov. 2011).

The disadvantage of this method as well as the disadvantage of other similar search techniques is that it tends to apply 'approximate' algorithms for the selection and ranking of options, i.e. algorithms with linear or close to linear computational complexity $O(n)$, where n is the number of options. The decrease of complexity is usually achieved by means of simplification (or more precisely, by approximation) of the developed algorithms. However, such simplification reduces the accuracy of the results.

SUMMARY OF THE INVENTION

The technical task the claimed invention is designed to solve consists in the development of a method for the selection and ranking of options which has a low computational complexity and provide accurate results of the selection and ranking process.

The stated technical task is solved by the use of the first version of the proposed method for the selection and ranking of effective options. According to the invention, the first version of the method consists of the formation of evaluation criteria of relevance of options to the search query, the formation of the desired number of remained options or a set of selection and ranking rules as well as the sequence of their application, the evaluation for each option of the relevance value to the search query according to which all options are ranked, the sequential application at least in two stages of selection and ranking procedures in compliance to the idea of superposition, if the total number of options in the remaining set corresponds to the desired number of options or all given choice procedures are applied, the selection and ranking process stops and the remaining set of options is considered as the most effective, otherwise if the remaining set of options does not correspond to the desired number of options, the selection and ranking process continues until the desired number of options is achieved.

The first version of the proposed method is characterized by the following additional significant features:

If the initial set of options is too large so that an effective set of options cannot be found in a given time slot, the choice procedures with a linear computational complexity $O(n)$ are applied on the first stages. The set of eliminated options on the first stages has the lowest rank.

The evaluation criteria of relevance of options are formed on the second and further stages according to which choice procedures with computational complexity which is not less than quadratic $O(n^2)$ are applied. The set of eliminated options has lower rank than the set of remaining alternatives.

The stated technical task is solved by the use of the second version of the proposed method for the selection and ranking of effective options. According to the invention, the second version of the method consists of the formation of evaluation criteria of relevance of options to the search query, the formation of the desired number of remained options, the evaluation for each option of the relevance value to the search query according to which all options are ranked, the sequential application at least in two stages of selection and ranking procedures in compliance to the idea of superposition, if the total number of options in the remaining set corresponds to the desired number of options, the selection and ranking process stops and the remaining set of options is considered as the most effective, otherwise if the remaining set of options does not correspond to the desired number of options, the selection and ranking process continues until the desired number of options is achieved.

The second version of the proposed method is characterized by the following additional significant features:

If the initial set of options is too large so that an effective set of options cannot be found in a given time slot, the choice procedures with a linear computational complexity $O(n)$ are applied on the first stages. The set of eliminated options on the first stages has the lowest rank.

The evaluation criteria of relevance of options are set on the second and further stages according to which choice procedures with computational complexity which is not less than quadratic $O(n^2)$ are applied. The set of eliminated options has lower rank than the set of remaining alternatives.

A set of selection and ranking procedures and the order of their sequential application can be set additionally.

The stated technical task is solved by the use of the third version of the proposed method for the selection and ranking of effective options. According to the invention, the third version of the method consists of the formation of evaluation criteria of relevance of options to the search query, the formation of the set of selection and ranking rules as well as the sequence of their application, the evaluation for each option of the relevance value to the search query according to which all options are ranked, the sequential application at least in two stages of selection and ranking procedures in compliance to the idea of superposition, the selection and ranking process continues until all defined choice procedures are not applied. The remaining set of options is considered as the most effective, The third version of the proposed method is characterized by the following additional significant features:

If the initial set of options is too large so that an effective set of options cannot be found in a given time slot, the choice procedures with a linear computational complexity $O(n)$ are applied on the first stages. The set of eliminated options on the first stages has the lowest rank.

The evaluation criteria of relevance of options are set on the second and further stages according to which choice procedures with computational complexity which is not less than quadratic $O(n^2)$ are applied. The set of eliminated options has lower rank than the set of remaining alternatives.

The desired number of remaining options can be set additionally.

Some additional procedures as well as the order of their sequential application can be set and applied additionally for the selection and ranking of the most effective set of options.

The technical result achieved by the implementation of the claimed method consists in higher speed and accuracy (reliability) of the selection and ranking process in search and recommendation systems, due to the possibility of using the idea of superposition which allows to adjust the computational complexity of choice and ranking procedures.

BRIEF DESCRIPTION OF THE DRAWINGS

The main idea of the method is provided on FIG. 1.

FIG. 1 shows the following items:

1—initial set of options (a set of different options);

2—elimination on the first stages of inefficient options by means of simple methods;

3—a set of options remained after the first stages;

4—further elimination of inefficient options with the use of selection procedures;

5—consistent application of the simple procedures for elimination of inefficient options;

6—a subset of the options that does not contain ineffective options;

7—ranking of option from step 6 with the use of both accurate and simple procedures;

8—the lowest rank is assigned to all ineffective options which were added to the final ranking of options;

9—providing the ranked set of options to the end-user;

10—sets of inefficient options eliminated during one of superposition stage.

DETAILED DESCRIPTION OF THE PREFERRED EMBODIMENTS

The proposed method is based on the idea of superposition which consists in sequential elimination of options according to some rules which can be different at each stage.

The claimed method is performed as follows (see FIG. 1).

A large set of options 1 which contains inefficient options as well is formed.

A term "a large set of options (search elements)" is considered within the concept of Big Data, which appeared in connection with the development of information technology and includes different approaches of processing huge volumes of diverse information.

A large set of options (search elements) in the framework of this concept means a structured or unstructured data set of huge volume and considerable diversity.

In order to eliminate inefficient options and select the most effective options the evaluation criteria of relevance of options to the user query are formed. Additionally, a desired number of efficient options (search elements) can be set. Then all options are evaluated according to the pre-defined criteria and ranked according to some rule. The selection and ranking process is performed with the use of superposition at least in two stages. It should be noted that a set of selection and ranking procedures can be defined as well as the order of application of these procedures.

If the initial set of options is too large so that an effective set of options cannot be found in a given time slot, the choice procedures with a linear computational complexity $O(n)$ are applied on the first stage (item 2 on FIG. 1). In order to do it, some existing selection and ranking methods, for instance, the plurality rule, the Borda rule or the threshold rule, can be applied. The most detailed list of selection and ranking rules is provided in Appendix 1.

As a result, two sets of options are formed: a set of options 10 with the lowest rank, and a set of options 3 which will be further analyzed.

A set of options 10 with the lowest rank is eliminated (item 10 on FIG. 1).

The evaluation criteria of relevance of options according to which all options will be ranked are set on the further stage. To rank the options choice procedures with computational complexity that is not less than quadratic $O(n^2)$ are applied on the remained set with compliance of the idea of superposition (item 5 on FIG. 1). In order to do it, some existing selection and ranking methods, for instance, the minimal undominated set, the Richelson rule or other rules based on majority or tournament matrixes, can be used. The most detailed list of selection and ranking rules is provided in Appendix 1.

The selection and ranking process stops and the remaining set of options (search elements) is considered as the most effective or perspective when all defined selection and ranking procedures are applied or when the remaining set of options contains a desired number of options. The selection and ranking process can be repeated by addition of new selection and ranking procedures.

Otherwise, the selection and ranking process continues as it is shown on the FIG. 1 (items 7 and 8). In other words, a set of options 6 is ranked with the use of selection and ranking procedures 7 and, if it is necessary, a set of options 10 is added to the final set (item 8 on FIG. 1). The selection and ranking process (item 9 on FIG. 1) stops when all defined selection and ranking procedures are used or when the remaining set of options consists of a desired number of options. The remaining set of options 9 (search elements) is considered as the most effective or perspective. That is how the selection of efficient options, their ranking and presentation to the end-user is organized.

The superposition approach is used when it is impossible to identify which options are efficient and which of them are inefficient by means of only one criterion. One of the main features of the method is the ability to identify the set of efficient options when one deals with large number of options or criteria. Another feature of the method is the ability to adjust its computational complexity. The method also allows the users to switch from some complicated methods of identifying the set of efficient options to the combination of simpler methods. The results of the previous stages of the selection and ranking process are used as the input for the next stages of the process.

Furthermore, the method enables the use of a set of criteria at the same stage which is not possible to do, for instance, in decisions trees.

Unlike various existing methods the use of superposition is quite flexible and allows to vary the number of steps in the selection and ranking process.

The superposition approach decreases the possibility of losing effective options which could be eliminated when more traditional methods are used. After sequential stages of elimination, all remained options can be ranked. All options eliminated on previous stages have the lowest (worst) rank and are to be chosen in the last turn.

It is also necessary to mention that by means of simple (we may call them approximate) procedures, which are used for a fast elimination of options, we subsume a set of selection and ranking procedures with a linear computational complexity $O(n)$. These procedures should use (read) the criterial values of each criterion no more than k times, which is independent to the number of options n, and significantly less than n. In the best case each option is used only once in a rule with a low computational complexity $O(n)$. The simple procedures should define if the given option is efficient or inefficient based only on the values of this option and without comparing it to any other options. For instance, for the rule "eliminate options with a criterial value lower than average value" it is necessary to use (read) the value of each option only twice: in order to calculate the average and in order to determine if the value is higher or lower than the average value. This rule has a linear computational complexity $O(n)$.

Thus, the use of methods for the selection and ranking of options, characterized by linear computational complexity $O(n)$ provides a significant increase in the speed of the selection of effective options in search or recommendation systems.

When the initial set of options is too large no accurate procedures for selection and ranking of options can be used due to their computational complexity. However, if we use some simple procedures to decrease the initial set of options, the accurate choice procedures can be used.

It is necessary to mention that by accurate procedures, which are used on small datasets, we mean a set of selection and ranking procedures with computational complexity that highly depends on the total amount of options. There are some procedures which use a pairwise "distance" between options (alternatives). In such procedures in is necessary to compare each option with all other options, i.e., to make n·n operations. For this case, the computational complexity is quadratic. There are also procedures that compare each option with all possible sets of other options. For this case, the computational complexity is even higher than quadratic.

It can be said that procedures with a computational complexity higher than quadratic $O(n2)$ cannot be applied on the full set of options in the search or ranking problems since their computational complexity highly depends on total amount of options.

Thus, the possibility of using accurate procedures ensures a considerable increase in accuracy (reliability) of the results of the selection and ranking of efficient options in search and recommendation systems.

The advantage of the proposed method consists in the ability to adjust the computational complexity of the selection and ranking process. It means that for situations when the application of accurate procedures requires enormous computational resources we can use some simple procedures and then apply these accurate procedures on the remaining set of options. In other words, by setting the limits on the number of simultaneously used computing resources we can define the total number of stages when simple (approximate) selection and ranking procedures are used and at which stage some accurate procedures can be applied. This is what we mean by the ability to adjust or manage the computational complexity of the method.

The method can also be used in learning to rank problem when it is necessary to predict the relevance of option by using some training set. In other words, the proposed method can predict the value of efficiency of one set of options based on the known efficiency values of other set of options.

The method may be implemented using existing hardware and software tools. The implementation of the proposed method includes:

1. Data collection and storage;
2. Data processing, the selection and ranking process;
3. Presentation of results to the end user.

Data collection and storage. At this stage the collection and storage of relevant information about the existing options is performed. Information about existing options can be collected from various data sources, for instance, from different information systems, web sites, web services, data repositories, files on computers, i.e., from any data sources which contain such information in a suitable format for further processing. The data collection can be performed with the use of different existing software which extract data from external data sources (e.g., ETL-systems or web crawlers). The data collection process can also be implemented on the computer using any programming language (e.g., C, C++, C #, Java, Python, PHP) etc. The data storage can be performed on the server or on any other media which make it possible to make a further reading of information. In addition, the storage of information can be performed directly in RAM of the computer for the case when it is not necessary to create a permanent storage of information.

Data processing includes the selection and ranking process with the use of simple and accurate procedures which follows. First, some irrelevant pages can be eliminated with the use of some simple procedures. The page may be irrelevant, for example, if it does not contain any word from the query or include spam, viruses, adware or other undesired content to the user. After eliminating such pages we can apply some accurate procedures which require large computational resources. The above-mentioned irrelevant pages can never be relevant to the user's request, which means that their presence in the set is redundant. In this example, the use of superposition of some simple (approximate) procedures for elimination of irrelevant pages and some accurate procedures for the ranking of relevant alternatives gives an advantage in the velocity and accuracy for obtaining the results. In particular, there is no need to do some detailed ranking for irrelevant pages.

TABLE 1

Comparison of the accurate selection procedure (Pareto set) and the four-stage method based on the idea of superposition.

| No | Covered query term number in the header of the webpage | Covered query term number in the whole webpage | Boolean model (existence of all terms from the query in the webpage) | Pareto set rule | Stage 1. Threshold rule on the first column | Stage 2. Threshold rule on the second column | Stage 3. Threshold rule on the third column | Stage 4. Pareto set rule |
|---|---|---|---|---|---|---|---|---|
| 1 | 1 | 6 | 1 | 0 | 1 | 1 | 1 | 0 |
| 2 | 2 | 10 | 1 | 1 | 1 | 1 | 1 | 1 |
| 3 | 4 | 7 | 0 | 0 | 1 | 1 | 0 | 0 |
| 4 | 0 | 3 | 1 | 0 | 0 | 0 | 0 | 0 |
| 5 | 3 | 9 | 1 | 1 | 1 | 1 | 1 | 1 |
| 6 | 4 | 8 | 1 | 1 | 1 | 1 | 1 | 1 |
| 7 | 1 | 1 | 0 | 0 | 1 | 1 | 0 | 0 |
| 8 | 0 | 0 | 0 | 0 | 0 | 0 | 0 | 0 |
| 9 | 1 | 0 | 0 | 0 | 1 | 0 | 0 | 0 |
| 10 | 0 | 0 | 0 | 0 | 0 | 0 | 0 | 0 |
| 11 | 0 | 0 | 0 | 0 | 0 | 0 | 0 | 0 |
| 12 | 0 | 0 | 0 | 0 | 0 | 0 | 0 | 0 |
| 13 | 0 | 0 | 0 | 0 | 0 | 0 | 0 | 0 |
| 14 | 0 | 0 | 0 | 0 | 0 | 0 | 0 | 0 |
| 15 | 0 | 2 | 0 | 0 | 1 | 0 | 0 | 0 |
| 16 | 0 | 0 | 0 | 0 | 0 | 0 | 0 | 0 |
| 17 | 0 | 1 | 0 | 0 | 0 | 0 | 0 | 0 |
| 18 | 0 | 0 | 0 | 0 | 0 | 0 | 0 | 0 |
| 19 | 0 | 0 | 0 | 0 | 0 | 0 | 0 | 0 |
| 20 | 0 | 0 | 0 | 0 | 0 | 0 | 0 | 0 |
| 21 | 0 | 0 | 0 | 0 | 0 | 0 | 0 | 0 |
| 22 | 0 | 0 | 0 | 0 | 0 | 0 | 0 | 0 |
| 23 | 0 | 1 | 0 | 0 | 0 | 0 | 0 | 0 |
| 24 | 0 | 0 | 0 | 0 | 0 | 0 | 0 | 0 |
| 25 | 0 | 0 | 0 | 0 | 0 | 0 | 0 | 0 |
| 26 | 0 | 0 | 0 | 0 | 0 | 0 | 0 | 0 |
| 27 | 0 | 0 | 0 | 0 | 0 | 0 | 0 | 0 |
| 28 | 0 | 0 | 0 | 0 | 0 | 0 | 0 | 0 |
| 29 | 0 | 1 | 0 | 0 | 0 | 0 | 0 | 0 | can be implemented on computer. The data processing stage can be performed both on the server and on the computer of the end user.

After applying the selection and ranking process the set of efficient options are presented to the end user in any suitable format. The results can also be stored on server or other media which allows to make a further reading of information.

EXAMPLES OF THE METHOD

Example 1. The Problem of Finding Relevant Pages on the Internet with the Use of the Idea of Superposition The problem of finding relevant pages on the Internet with the use of the idea of superposition can be performed as Table 1 provides a comparison of different methods of the selection of relevant pages from the initial set—the Pareto set rule and the four-stage method based on the idea of superposition. Suppose that there are 29 pages and each page is estimated by three criteria: covered query term number in the header of the webpage, covered query term number in the whole webpage and the Boolean model (existence of all terms from the query in the webpage).

If we use the Pareto set rule on the initial set of webpages, the relevant webpages will be No 2, 5, 6. However, almost each webpage should be compared with all other webpages, i.e., 29 webpages should be compared with each other. It means that the more webpages is in the initial set, the more pairwise comparisons should be performed. It means that for the case when the total number of alternatives is too large the Pareto set rule cannot be applied.

However, the Pareto rule can be applied if we use some simple procedures on the first stages. Table 1 provides a four-stage method for the selection of relevant webpages. On the first three stages a super-threshold rule is applied while the Pareto set rule is used on the final stage.

On the first stage we eliminate all webpages that does not contain any term from the query in the header of the webpage. Thus, the number of options is reduced from 29 to 8. On the second stage we eliminate all webpages that does not contain any term from the query in the whole webpage. Thus, the number of options is reduced from 8 to 6. On the third stage we eliminate all webpages according to the value of Boolean model. Thus, the number of options is reduced from 6 to 4.

Now we can apply the Pareto set rule. As the total number of webpages is 4, a small number of pairwise comparisons should be performed. The results of the rule are webpages No 2, 5, 6.

In this example, the results of both methods are identical. However, the computational complexity of the Pareto set rule is higher than the computational complexity of the four-stage superposition model since more pairwise comparison should be made. For the case when we deal with 29 webpages this fact is not important but it becomes critical on large datasets. Thus, the second method should be used on large datasets since it allows users to decrease the computational complexity by combining simple and more complex accurate procedures.

Example. 2. Conducting Marketing Campaigns in Social Networks

In a number of models to provide the most interesting offers to the participants of social networks, it is necessary to group all users according to their interests or to the intensity of the information exchange between them. In this case, a super-threshold rule "no more than one contact for the last year" allows to immediately decrease the total number of options within the group to some acceptable level for more accurate algorithms. Of course, the presence of more than one contact per year does not mean that the interests of the remained users are the same, but the use of this rule eliminate inefficient groups of participants of social networks.

Thus, the present method allows to perform the selection and ranking of large datasets characterized by a hundreds or even thousands of criteria. The method can be used for the selection of efficient options in search, recommendation systems, decision support systems, Internet networks, traffic classification systems and other relevant fields. Furthermore, the invention can be used in the learning to rank problem, for instance, for estimating the performance level of enterprises, retail networks etc.

APPENDIX 1

List of choice procedures provided in [Aleskerov F., Kurbanov E. 'On a degree of manipulability of collective choice rules', Automation and Remote Control, 1998, no. 10, 134-146]

The Plurality Rule

Choose options that have been admitted to be the best by the maximum number of criteria, i.e., $$a \in C(\vec{P}_X, X) \Leftrightarrow [\forall x \in X : n^+(a, \vec{P}_X) \geq n^+(x, \vec{P}_X)],$$

where $n^+(a, \vec{P}_X) = \text{card}\{i \in N | \forall y \in X \setminus \{a\} : a P_i y\}$.

The computational complexity of the plurality rule is linear for the selection and ranking of options.

The q-Approval Voting Rule

Let us define $$n^+(a, \vec{P}_X, q) = \text{card}\{i \in N | \text{card}\{y \in X | y P_i a\} \leq q-1\},$$

where $n^+(a, \vec{P}_X, q)$ is the number of criteria for which the option a is placed on one of q first places in the ordering of options. Thus, if q=1, then a is the first best option for criterion i; if q=2, then a is either first best or second best option, etc. The integer q can be called as the degree of the choice procedure.

Now we can define the q-Approval rule:

$$a \in C(\vec{P}_X, X, q) \Leftrightarrow [\forall x \in X : n^+(a, \vec{P}_X, q) \geq n^+(x, \vec{P}_X, q)],$$

i.e., the options are chosen that have been admitted to be among q best options by the maximum number of criteria.

It can be easily seen that the q-Approval rule is a direct generalization of the plurality rule; for the latter q=1.

The computational complexity of the q-Approval voting rule is close to linear for the selection. As for the ranking of options, the computational complexity of the rule depends on the value of the integer q. For the case q<<n it is close to linear but for the case the computational complexity is close to quadratic.

The Threshold Rule

Let $v_1(x, \vec{P}_X)$ be the number of criteria for which the option x is the worst in their ordering, $v_2(x, \vec{P}_X)$ is the number of criteria placing x the second worst, and so on, $v_m(x, \vec{P}_X)$ is the number of criteria considering the option x as their best one. Then we order the options lexicographically. The option x is said to V-dominate the option y if $v_1(x, \vec{P}_X) < v_1(y, \vec{P}_X)$ or, if there exists k≤m, such that $v_i(x, \vec{P}_X) = v_i(y, \vec{P}_X)$, i=1, . . . , k-1, and $v_k(x, \vec{P}_X) < v_k(y, \vec{P}_X)$. In other words, first, the number of worst places are compared, if these numbers are equal than the number of second worst places are compared, and so on. The options which are not dominated by other options via V are chosen.

The computational complexity of the threshold rule is linear for the selection and ranking of options.

The Borda Rule

Put to each $x \in X$ into correspondence a number $r_i(x, \vec{P}_X)$ which is equal to the cardinality of the lower contour set of x in $P_i \in P_X$, i.e., $r_i(x, \vec{P}_X) = |\{b \in X : x P_i b\}|$. The sum of that numbers over all $i \in N$ is called the Borda count for the option x, $$r(x, \vec{P}_X) = \Sigma_{i=1}^n r_i(x, \vec{P}_X).$$

An option with the maximum Borda count is chosen, i.e., $$a \in C(\vec{P}_X, X) \Leftrightarrow [\forall b \in X : r(a, \vec{P}_X) \geq r(b, \vec{P}_X)].$$

The computational complexity of the Borda rule for the selection is close to linear when criterial estimates of options are presented in the form of ranking. Otherwise, the computational complexity of the Borda rule for the selection is close to quadratic. As for the ranking of options, the computational complexity of the rule depends on the initial set of options and for the worst case it is not less than quadratic.

The Black Procedure

First, we define a majority relation μ as a binary relation which is constructed as $$x \mu y \Leftrightarrow \text{card}\{i \in N | x P_i y\} > \text{card}\{i \in N | y P_i x\}.$$

According to the Black procedure the Condorcet winner rule is applied on the first stage. The Condorcet winner $C(\vec{P}_X, X)$ in the profile $\vec{P}_X$ is an option that dominates all other options via majority relation µ, i.e., $$C(\vec{P}_X, X) = [a \in X | \forall x \in X \setminus \{a\}, a\mu x].$$

If the Condorcet winner exists, it is to be chosen. Otherwise, the Borda rule is applied.

The computational complexity of the Black procedure is not less than quadratic for the selection and ranking of options.

The Coombs Procedure

The option x that have been admitted to be the worst by the maximum number of criteria is omitted. Then the procedure again applied to the narrowed set $X' = X \setminus \{x\}$ and the profile $\vec{P}_{X'}$. The procedure stops when after applying the rule the narrowed set of options is empty.

The computational complexity of the Coombs procedure for the selection and ranking of options depends on the initial set of options. For the best case it is close to linear, the worst case it is close to quadratic.

The Hare Procedure

The option x that have been admitted to be the best by the minimum number of criteria is omitted. Then the procedure again applied to the narrowed set $X' = X \setminus \{x\}$ and the profile $\vec{P}_{X'}$. The procedure stops when after applying the rule the narrowed set of options is empty.

It is necessary to note the difference between the Coombs procedure and the Hare procedure. In the Coombs procedure we eliminate options that have been admitted to be the worst by the maximum number of criteria while in the Hare procedure we eliminate options that have been admitted to be the best by the minimum number of criteria.

The computational complexity of the Hare procedure for the selection and ranking of options depends on the initial set of options. For the best case it is close to linear, the worst case it is close to quadratic.

The Inverse Plurality Rule

The option, which is regarded as the worst by the minimum number of criteria, is chosen, i.e., $$a \in C(\vec{P}_X, X) \Leftrightarrow [\forall x \in X : n^-(a, \vec{P}_X) \leq n^-(x, \vec{P}_X)],$$

where $n^-(a, \vec{P}_X) = \text{card}\{i \in N | \forall y \in X \setminus \{a\} : y P_i a\}$.

The computational complexity of the inverse plurality rule is linear for the selection and ranking of options.

The Inverse Borda Procedure

For each option the Borda count is calculated and the option with the minimum Borda count is omitted. Then Borda counts are re-calculated for the profile $\vec{P}_{X'}, X' = X \setminus \{x\}$, and the procedure is repeated until after applying the procedure the choice is empty.

The computational complexity of the inverse Borda procedure is not less than quadratic for the selection and ranking of options.

The Nanson Procedure

For each option the Borda count is calculated. Then the average Borda count is calculated, $$\bar{r}(\vec{P}_X, X) = \frac{\sum_{x \in X} r(x, \vec{P}_X)}{|X|},$$

and options are omitted for which the Borda count is less or equal than the mean value. Then the set $X' = X \setminus \{Y\}$ is considered, where $Y \subset X$ is a set of options with the Borda count that is less or equal than the average value, and the procedure is applied to the profile $\vec{P}_{X'}$. Such procedure is repeated until all remaining options will have the same Borda count.

The computational complexity of the Nanson procedure is not less than quadratic for the selection and ranking of options.

Minimal Dominant Set

A set Q is called dominant one if each option in Q dominates each option outside Q via majority relation µ. Otherwise speaking, $$\forall x \in X$$

$$x \in Q \Leftrightarrow [\forall y \in X \setminus Q : x\mu y].$$

Then a dominant set Q is called the minimal one if none of its proper subsets is a dominant set. The choice is defined as $C(\vec{P}_X, X) = Q$. If such set is not unique, then the social choice is defined as the union of these sets.

The computational complexity of the minimal dominant set is not less than quadratic for the selection and ranking of options.

Minimal Undominated Set

A set Q is called undominated one if no option outside Q dominates some option in Q via majority relation µ, i.e., $$x \in Q \Leftrightarrow [\nexists y \in X \setminus Q : y\mu x].$$

Undominated set Q is called the minimal one if none of its proper subsets is undominated set. The choice is defined as $C(\vec{P}_X, X) = Q$. If such set is not unique, then the choice is defined as the union of these sets.

The computational complexity of the minimal undominanted set is not less than quadratic for the selection and ranking of options.

Minimal Weakly Stable Set

A set $Q \subseteq A$ is called weakly stable if it has the following property:

$$\forall x \in X$$

$$x \in Q \Leftrightarrow [\exists y \in X \setminus Q : y\mu x \Rightarrow \exists z \in Q : z\mu y],$$

i.e., x belongs to Q if there exists an option $y \in X \setminus Q$ which dominates x via majority relation µ, then there exists an option $z \in Q$, which dominates y, i.e., $z\mu y$. A set $Q \subseteq A$ is called the minimal weakly stable one if none of its proper subsets is a weakly stable set. The choice is defined as $C(\vec{P}_X, X) = Q$. If such set is not unique, then the choice is defined as the union of these sets.

The computational complexity of the minimal weakly stable set is not less than quadratic for the selection and ranking of options.

The Fishburn Rule

Construct the upper contour set $D(x, \vec{P}_X)$ of x in the relation µ, and the binary relation γ as follows $$x\gamma y \Leftrightarrow D(x, \vec{P}_X) \subset D(y, \vec{P}_X).$$

Note that the binary relation γ is a partial order.

Then undominated options on γ are chosen, i.e., $$x \in C(\vec{P}_X, X) \Leftrightarrow [\nexists y \in X : y\gamma x].$$

The computational complexity of the Fishburn rule is not less than quadratic for the selection and ranking of options.

Uncovered Set I

Construct the lower contour set $L(x, \vec{P}_X)$ of x in the relation $\mu$, and the binary relation $\delta$ as follows $$x\delta y \Leftrightarrow L(x,\vec{P}_X) \supset L(y,\vec{P}_X).$$

Then undominated options on $\delta$ are chosen, i.e., $$x \in C(\vec{P}_X,X) \Leftrightarrow [\not\exists\, y \in X y\delta x].$$

The computational complexity of the uncovered set I is not less than quadratic for the selection and ranking of options.

Uncovered Set II

An option x is said to B-dominate an option y (denoted as xBy) if $x\mu y$ and $D(x, \vec{P}_X) \subset D(y, \vec{P}_X)$, where $D(x, \vec{P}_X)$ is the upper contour set of x in $\mu$. The choice consists of B-undominated options, i.e., $$x \in C(\vec{P}_X,X) \Leftrightarrow [\not\exists\, y \in X yBx].$$

The computational complexity of the uncovered set II is not less than quadratic for the selection and ranking of options.

The Richelson Rule

Construct lower and upper contour sets $D(x, \vec{P}_X)$ and $L(x, \vec{P}_X)$ for each $x \in X$ in the relation $\mu$, and binary relation $\sigma$ as follows $$x\sigma y \Leftrightarrow \begin{cases} D(x, \vec{P}_X) \subseteq D(y, \vec{P}_X) \text{ and} \\ L(x, \vec{P}_X) \supseteq L(y, \vec{P}_X) \text{ and} \\ D(x, \vec{P}_X) \subset D(y, \vec{P}_X) \text{ or } L(x, \vec{P}_X) \supset L(y, \vec{P}_X). \end{cases}$$

Then undominated options on $\sigma$ are chosen, i.e., $$x \in C(\vec{P}_X,X) \Leftrightarrow [\not\exists\, y \in X y\sigma x].$$

The computational complexity of the Richelson rule is not less than quadratic for the selection and ranking of options.

The Copeland Rule 1

For each option $x \in X$ we construct a function $u(x, \vec{P}_X)$ as $$u(x,\vec{P}_X) = |L(x,\vec{P}_X)| - |D(x,\vec{P}_X)|,$$

where $L(x, \vec{P}_X)$ is the lower counter set of options, i.e. a set of options which are dominated by option x via the majority relation $\mu$, $L(x, \vec{P}) = \{y \in A | x\mu y\}$. $D(x, \vec{P})$ is the upper counter set of options, i.e. a set of options which dominate option x via the majority relation $\mu$, $D(x, \vec{P}) = \{y \in A | y\mu x\}$.

The choice is defined by maximization of $u(x, \vec{P}_X)$, that is $$x \in C(\vec{P}_X,X) \Leftrightarrow [\not\exists\, y \in X : u(y,\vec{P}_X) > u(x,\vec{P}_X)].$$

The computational complexity of the Copeland rule 1 is quadratic for the selection and ranking of options.

The Copeland Rule 2

The function $u(x, \vec{P}_X)$ is defined by cardinality of lower contour set of the option $x \in X$ via majority relation $\mu$. The choice is defined by maximization of $u(x, \vec{P}_X)$.

The computational complexity of the Copeland rule 2 is quadratic for the selection and ranking of options.

The Copeland Rule 3

The function $u(x, \vec{P}_X)$ is defined by cardinality of upper contour set of the option $x \in X$ via majority relation $\mu$. The choice is defined by minimization of $u(x, \vec{P}_X)$.

The computational complexity of the Copeland rule 3 is quadratic for the selection and ranking of options.

The Run-Off Procedure

First, the simple majority rule is used. If a winner exists, the procedure stops. Otherwise, two options that have been admitted to be the best by the maximum number of criteria are taken. Assuming that criterial values of these two options do not change, again the simple majority rule is applied. Since options are arranged in n linear orders, single winner (if n is odd) always exists.

The computational complexity of the run-off procedure is linear for the selection. As for the ranking of options, the computational complexity of the rule depends on the value of the integer q. For the case $q \ll n$ it is linear but for the case $q \approx n$ the computational complexity is quadratic.

Single Transferable Vote System

First, the simple majority rule is used. If a winner exists, the procedure stops. Otherwise, the option x that have been admitted to be the best by the minimum number of criteria is omitted. Then the procedure again applied to the narrowed set $X' = X \setminus \{x\}$ and the profile $\vec{P}_{X'}$. The procedure stops when an option that has been admitted to be the best by 50%+1 criteria is found.

The computational complexity of the run-off procedure is linear for the selection and ranking of options.

The Young Procedure

If the Condorcet winner exists, it is to be chosen. Otherwise, all non-empty coalitions (groups) of criteria are considered, and partial Condorcet winner is defined. The function $u(x, \vec{P}_X)$ is constructed as cardinality of maximal coalition in which x is the Condorcet Winner. Then the option with maximal value $u(x, \vec{P}_X)$ is chosen.

The computational complexity of the Young procedure is not less than quadratic for the selection and ranking of options.

The Simpson Procedure (the Max min Procedure)

Construct the matrix $S^+(\vec{P}_X, X)$, such that $$\forall a,b \in X, S^+(\vec{P}_X,X) = (n(a,b,\vec{P}_X)),$$

where $n(a, b, \vec{P}_X) = \text{card}\{i \in N | aP_i b\}$, $n(a, a, \vec{P}_X) = +\infty$.

The choice is defined as $$x \in C(\vec{P}_X,X) \Leftrightarrow x \in \arg\max_{a \in X} \min_{b \in X}\{n(a,b,\vec{P}_X)\}.$$

The computational complexity of the Simpson procedure is not less than quadratic for the selection and ranking of options.

The Min max Procedure.

Construct the matrix $S^-(\vec{P}_X, X)$, such that $$\forall a,b \in X, S^-(\vec{P}_X,X) = (n(a,b,\vec{P}_X)),$$

where $n(a, b, \vec{P}_X) = \text{card}\{i \in N | aP_i b\}$, $n(a, a, \vec{P}_X) = -\infty$.

The choice is defined as $$x \in C(\vec{P}_X,X) \Leftrightarrow x \in \arg\min_{a \in X} \max_{b \in X}\{n(b,a,\vec{P}_X)\}.$$

The computational complexity of the min max procedure is not less than quadratic for the selection and ranking of options.

Strong q-Paretian Simple Majority Rule.

Let $f(\vec{P}_X; i, q) = \{x \in A \mid \text{card}(D_i(x)) \le q\}$.

Let $\mathcal{J} = \{I \subset N \mid \text{card}(I) = \lceil \frac{n}{2} \rceil\}$ be the family of simple majority coalitions of criteria.

Define a function $$C(\vec{P}_X, X) = \bigcup_{I \in \mathcal{J}} \bigcap_{i \in I} f(\vec{P}_X; i, q)$$

Then the social choice is defined as an option which is in between top options for each voter in at least one simple majority coalition. If there is no such an option, then the social choice is defined by increasing q by 1 until it is not empty. Again, if more than one option are chosen, the final choice is defined by alphabetical order.

The computational complexity of the Strong q-Paretian simple majority rule is exponential for the selection and ranking of options.

Strong q-Paretian Plurality Rule.

This rule is a counterpart of the Strong q-Paretian simple majority rule with the following addition. If several options are chosen, then for each option is counted out how many coalitions choose this option. Then the option with maximal value of this index is chosen.

The computational complexity of the Strong q-Paretian plurality rule is exponential for the selection and ranking of options.

Strongest q-Paretian Simple Majority Rule.

Define a function $$C(\vec{P}_X, X) = \bigcup_{I \in \mathcal{J}} f(\vec{P}_X; I, q),$$

where $f(\vec{P}_X; I, q) = \{x \in A \mid \text{card}(\bigcap_{i \in I} D_i(x)) \le q\}$, $\text{card}(I) = \lceil \frac{n}{2} \rceil$.

Then the social choice is the option which is Pareto optimal in each simple majority coalition with q=0. If there is no such an options, then q=1, q=2, etc., is considered until the social choice will not be empty.

The computational complexity of the Strongest q-Paretian simple majority rule is exponential for the selection and ranking of options.

The Super-Threshold Choice Rule

Let the criterion $\varphi(x)$ be defined over the set A, and the threshold function $V(X)$ over $2^A$ assigning to each subset $X \in 2^A$ a threshold level $V(X)$, $V(\bullet): 2^A \to \mathbb{R}^1$. Define the super-threshold rule as follows $y \in C(\vec{P}_X, X) \Leftrightarrow (y \in X : \varphi(y) \ge V(X))$.

The computational complexity of the super-threshold choice rule is linear for the selection. As for the ranking of options, the computational complexity of the rule depends on the initial set of options but for the worst case it is not more than quadratic.

What is claimed is:

1. A computer-implemented method for reducing computational complexity of selecting and ranking options in a search query of a search engine on the Internet and for enhancing accuracy of results presented to an end user in a user-readable format, the method comprising:
ranking relevance values of the options according to selected evaluation criteria;
selecting a desired number of remaining options in the search query based on a duration of a time slot allocated for executing the search query;
selecting (i) ranking rules including at least one threshold rule and the Borda rule or the Pareto set rule, and (ii) sequences of applying the ranking rules to the options;
reducing computational complexity by applying in sequential stages the ranking rules to the search query and at each of the stages eliminating the options having lowest of the relevance values until the desired number of the remaining options is achieved, wherein this step can be performed on a server and/or on a computer of the end user; and
presenting the results of eliminating the options to the end user of the search engine in the user-readable format, wherein the results can be stored in a RAM of the computer or on a computer-readable media; wherein:
the ranking rules having a linear computational complexity $O(n)$ are applied in a first portion of the stages; and
the ranking rules having not less than quadratic $O(n^2)$ computational complexity are applied after completion of the first portion of the stages.

2. The method of claim 1, wherein applying the first portion of the stages includes re-ranking of the relevance values.

3. The method of claim 1, wherein applying the second portion of the stages includes re-ranking of the relevance values.

4. The method of claim 1, further comprising:
selecting the desired number of the remaining options based on computational resources of the search engine.

5. A computer-implemented method for reducing computational complexity of selecting and ranking options in a search query of a search engine on the Internet and for enhancing accuracy of results presented to an end user in a user-readable format, the method comprising:
forming evaluation criteria of relevance of the options to the search query;
selecting (i) ranking rules including at least one threshold rule, and (ii) sequences of applying the ranking rules to the options;
selecting a desired number of remaining options in the search query based on computational resources of the search engine;
ranking relevance values of the options according to the evaluation criteria;
reducing computational complexity by applying in sequential stages the ranking rules to the search query and at each of the stages eliminating the options having lowest of the relevance values until the desired number of the remaining options is achieved, wherein this step can be performed on a server and/or on a computer of the end user; and
presenting the results of eliminating the options to the end user of the search engine in the user-readable format, wherein the results can be stored in a RAM of the computer or on a computer-readable media; wherein
the ranking rules having a linear computational complexity $O(n)$ are applied in a first portion of the stages; and
the ranking rules having not less than quadratic $O(n^2)$ computational complexity are applied after completion of the first portion of the stages.

6. The method of claim 5, wherein applying the first portion of the stages includes re-ranking of the relevance values.

7. The method of claim 5, wherein applying the second portion of the stages includes re-ranking of the relevance values.

8. The method of claim 5, further comprising:
   selecting the desired number of the remaining options based on a duration of a time slot allocated for executing the search query.

9. The method of claim 5, wherein the ranking rules include the plurality rule, the Borda rule, or the Pareto set rule.

* * * * *